(12) United States Patent
Dezord et al.

(10) Patent No.: US 8,748,840 B2
(45) Date of Patent: Jun. 10, 2014

(54) HIGH-RESOLUTION COMPACT GAMMA BURST DETECTOR

(75) Inventors: Jean-Bernard Dezord, Paris (FR); Michel Raou, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 14/002,057

(22) PCT Filed: Feb. 29, 2012

(86) PCT No.: PCT/EP2012/053410
§ 371 (c)(1),
(2), (4) Date: Aug. 28, 2013

(87) PCT Pub. No.: WO2012/117010
PCT Pub. Date: Sep. 7, 2012

(65) Prior Publication Data
US 2013/0327949 A1    Dec. 12, 2013

(30) Foreign Application Priority Data

Mar. 1, 2011   (FR) ...................................... 11 51654

(51) Int. Cl.
*G01J 1/42*     (2006.01)
*G01T 7/00*     (2006.01)

(52) U.S. Cl.
CPC ...................... *G01T 7/00* (2013.01)
USPC ....................................................... 250/394

(58) Field of Classification Search
CPC ......... G01T 1/026; G01T 7/00; G01T 1/2928; G01T 1/243; G01T 1/1644; G01T 1/242; G01T 1/249; H01J 1/00; H01L 27/4658

USPC ......................................................... 250/394
See application file for complete search history.

(56) References Cited

U.S. PATENT DOCUMENTS

| | | | | |
|---|---|---|---|---|
| 4,090,080 | A * | 5/1978 | Tosswill | 250/366 |
| 4,420,689 | A * | 12/1983 | Rogers et al. | 250/385.1 |
| 6,100,532 | A * | 8/2000 | Bryman | 250/369 |
| 6,236,051 | B1 | 5/2001 | Yamakawa et al. | |
| 6,359,281 | B1 | 3/2002 | Pawlak et al. | |
| 6,403,964 | B1 * | 6/2002 | Kyyhkynen | 250/370.09 |
| 8,405,038 | B2 * | 3/2013 | Bouhnik et al. | 250/370.14 |
| 2001/0035497 | A1 | 11/2001 | Montemont et al. | |
| 2006/0076497 | A1 * | 4/2006 | Yamada et al. | 250/367 |
| 2010/0059846 | A1 | 3/2010 | Kim | |
| 2010/0308230 | A1 * | 12/2010 | Yanagita et al. | 250/370.09 |

* cited by examiner

*Primary Examiner* — Kiho Kim
(74) *Attorney, Agent, or Firm* — Muncy, Geissler, Olds & Lowe, P.C.

(57) ABSTRACT

The invention relates to a plane detector for a gamma ray burst imager, the detector comprising a multilayer ceramic interconnection circuit between external connectors and a processor circuit fastened on a rear face of the circuit and a detection module fastened on a front face of the circuit. The detection module includes a support having a rear face fastened to the circuit and a front face on which sensors are fastened, and a high voltage electrical connection device having a through portion passing through the support and extending between two adjacent sensors in order to connect a connection pad of the circuit to a conductive grid that extends at least in part between the sensors and that is electrically connected to a free face of each sensor.

9 Claims, 2 Drawing Sheets

HIGH-RESOLUTION COMPACT GAMMA BURST DETECTOR

The invention relates to a detector of x-ray and gamma ray photons, and it relates more particularly to the arrangement of such a detector.

BACKGROUND OF THE INVENTION

Gaining an understanding of the universe requires celestial bodies to be observed together with the physicochemical reactions that take place at those bodies. In order to observe them, use is made of x-ray and gamma ray detectors that enable the sources of such radiation to be located together with the most massive stellar bodies that are the main emitters.

Gamma rays are detected by detectors on board satellites in order to avoid the distortions and the alterations to the radiation caused by the Earth's atmosphere.

Such detectors comprise sensors capable of interacting with gamma photons together with a processor unit for processing the data coming from those sensors. In order to limit, interference due to connection wires, it is known to connect the processor unit directly to the sensors by integrating the processor unit directly on the sensors. Nevertheless, that solution is complex to implement and prevents those two components from being fabricated separately, even though both of them are complex.

In order to facilitate the fabrication of components, it is also known to connect them together via a wired electrical connection. The drawback of that solution is that the wire connections give rise to interference between the sensors and the processor unit.

OBJECT OF THE INVENTION

The object of the invention is to remedy those drawbacks by proposing a compact detector for x-ray and gamma radiation, minimizing interference and enabling the sensors and the processor unit to be fabricated and assembled independently of one another.

BRIEF DESCRIPTION OF THE INVENTION

The invention provides a plane detector for a gamma ray burst imager, the detector comprising a multilayer interconnection circuit between external connectors and a processor circuit fastened on a rear face of the circuit and a detection module fastened on a front face of the circuit, the detection module including a support having a rear face fastened to the circuit and a front face on which sensors are fastened, and a high voltage electrical connection device having a through portion passing through the support and extending between two adjacent sensors in order to connect a connection pad of the circuit to a conductive grid that extends at least in part between the sensors and that is electrically connected to a free face of each sensor.

The use of a conductive grid and of a connection device passing through the sensor support makes it possible to obtain a detection module that is particularly compact. The term "a conductive grid that extends at least in part between the sensors" covers all situations in which the grid extends facing an inter-sensor space situated between two adjacent sensors, even if the grid does not extend exclusively within the inter-sensor space, as applies to the embodiment shown in FIGS. 1 to 3. Thus, the connection device does not mask the sensors nor does it occupy the sides of the detector. It becomes easy to assemble the detectors side by side in order to produce a camera having high resolution and small dead zones.

In addition, the sensors remain separate from the processor circuit, which enables those components to be produced more easily and thus less expensively.

The detector may be made even more compact by the grid having connection pads arranged to cover the corners of four adjacent sensors.

The grid then extends over a minimum area, thereby enabling a maximum radiation-sensing area to be left free.

BRIEF DESCRIPTION OF THE DRAWINGS

Other characteristics and advantages of the invention appear on reading the following description of a particular, nonlimiting embodiment of the invention.

Reference is made to the accompanying drawings, in which.

DETAILED DESCRIPTION OF THE INVENTION

The detector of the invention is for installing on an x-ray and gamma ray detection satellite that includes a camera pointed towards potential sources of radiation.

Figure 1:
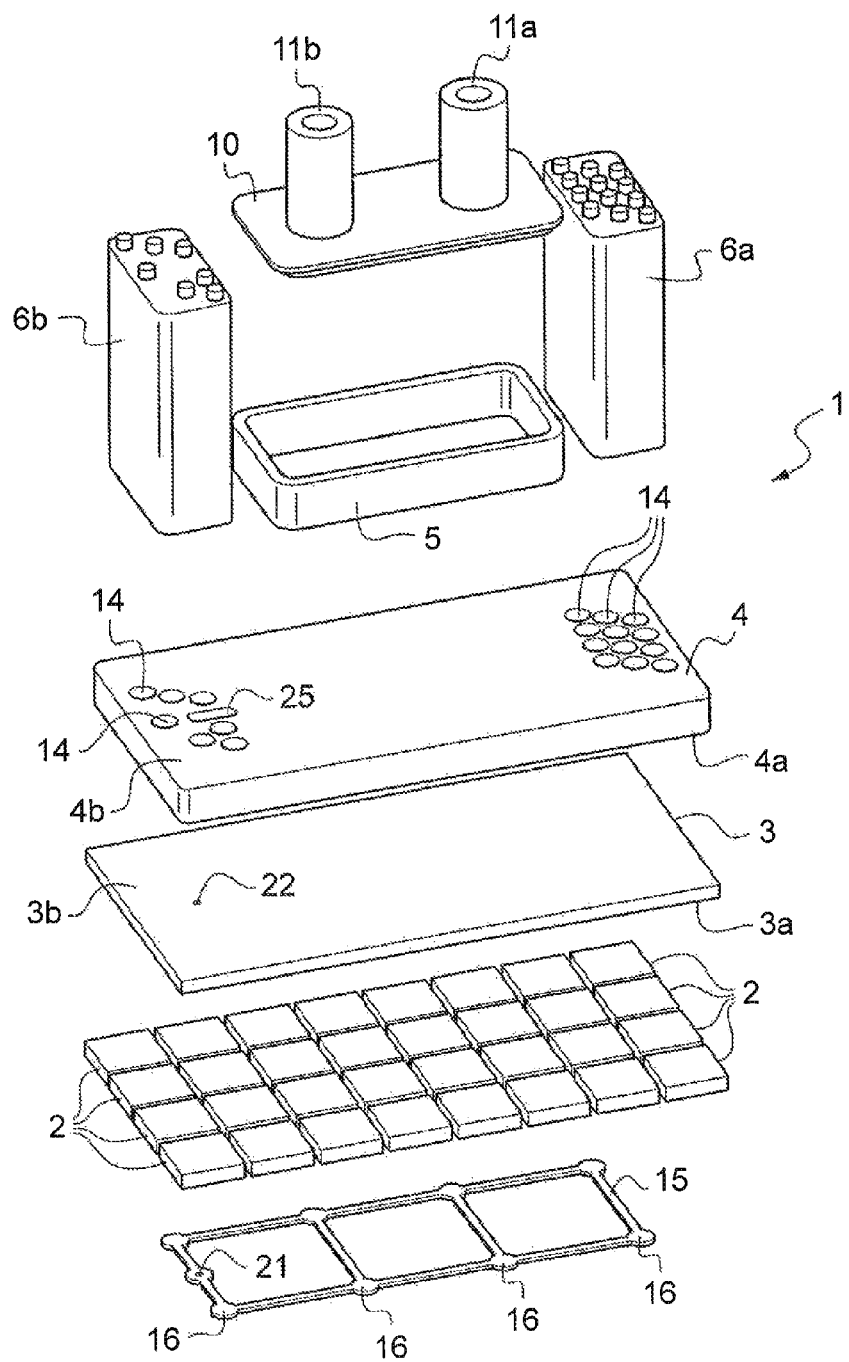
FIGS. 1 and 2 are respectively an exploded view and an assembled view of a detector of the invention.
Figure 2:
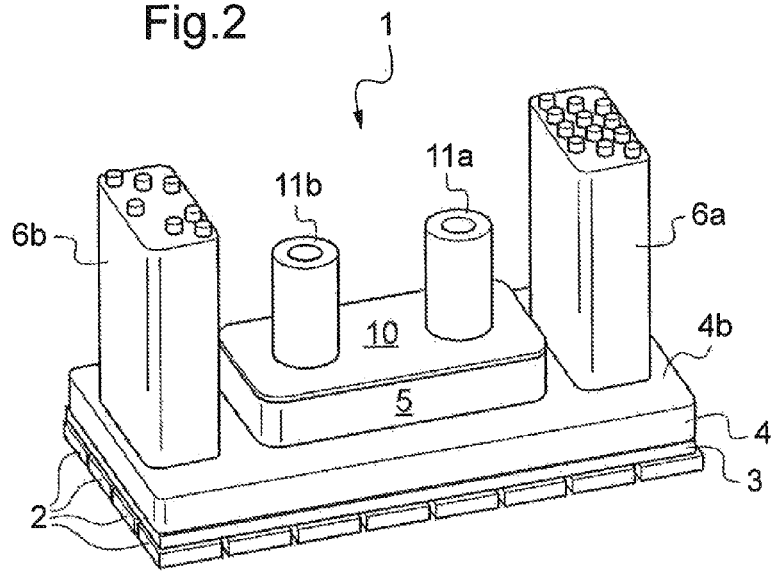
Figure 3:
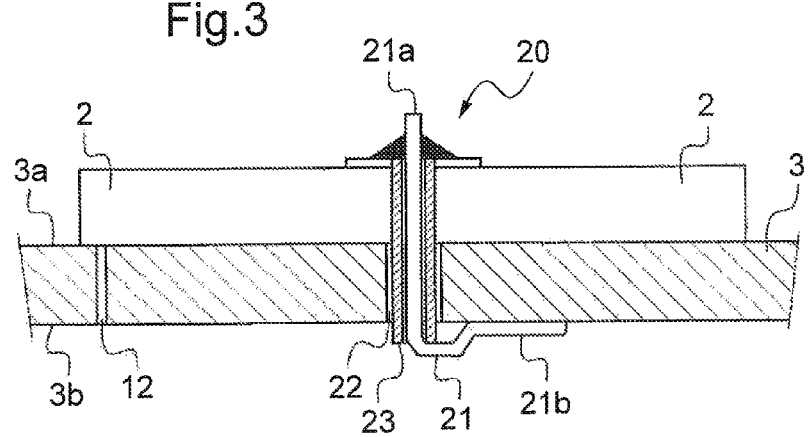
FIG. 3 shows an electrical connection device used in a preferred embodiment of the invention.

Such a camera is made up of a plurality of individual detectors 1, as shown in FIGS. 1 and 2, which detectors are adjacent to one another in order to constitute a detection surface.

Each detector 1 itself comprises a plurality of sensors 2 arranged side by side to form an individual detection surface. The sensors 2 are arranged in a plate of four sensors by eight sensors (i.e. 32 sensors per detector) and they are adhesively bonded on the front face 3a of an electrically insulating rigid support 3. The sensors 2 are thus arranged to present a free face that is sensitive to radiation. The support 3 is pierced by a plurality of electrical connection tracks 12, each corresponding to a respective sensor 2 and opening out into the rear face 3b of the support 3.

The rear face 3b of the support 3 is adhesively bonded to a front face 4a of a multilayer circuit 4 made of co-sintered ceramic that enables electrical connections to he made between the detection module and a processor circuit 5 together with external connectors 6a and 6b connected by contact on a rear face 4b of said multilayer circuit 4.

The processor circuit 5 is contained in an enclosure that is closed by a lid 10 that has two fastener studs 11a and 11b.

Each sensor 2 is thus electrically connected to the processor circuit 5 via the connection tracks 12 of the support 3 and then via the multilayer electrical circuit 4.

On its front and rear faces 4a and 4b, the multilayer circuit 4 has electrical connection points 14 for electrically connecting the processor circuit 5 to the external connectors 6a, 6b (themselves connected to a data transmission module), and to the sensors 2.

The multilayer structure of the circuit 4 serves to bring together the various connections between the components into a circuit that is compact. The processor circuit 5 is physically separated from the sensors 2, thus making it possible to produce and quality check each of the components separately. In addition, the processor circuit 5 and the sensors 2 are separated only by the support 3 and the multilayer circuit 4, thereby greatly limiting any possibility of interference in the transmission of information.

The sensors 2 are arranged to form a plate that is as compact as possible in order to optimize resolution. The clearance between the sensors 2 constitutes a dead zone in the detector that decreases the resolution of the detector 1 while increasing the area occupied by the detector 1.

It is therefore essential to minimize the clearance between the sensors 2.

In order to pick up radiation, the free faces of the sensors 2 must be biased with a high voltage (potential lying in the range −400 volts (V) to −800 V). In order to apply this potential, the detector 1 has a conductive grid 15 that extends between the sensors 2 and that includes eight conductive pads 16, each of which is arranged to cover the corners of four adjacent sensors 2.

The grid 15 is electrically powered by an electrical connection device 20 that passes through the support 3 of the sensors 2 in order to connect the grid 15 electrically with the external connector via the multilayer ceramic interconnection circuit 4.

The conductive grid 15 is made of a low thermal expansion alloy such as an alloy of the Kovar type (FeNi29Co18). The sensors 2 are preferably made in a crystal of cadmium telluride, which crystal presents a low coefficient of expansion. The grid 15, fastened on the sensors 2, must therefore present a coefficient of thermal expansion that is compatible with that of the sensors 2 in order to avoid any relative movement between the two components. Alloys of the Kovar type are therefore appropriate for this embodiment of the invention.

The detail of the connection device 20 is shown in FIG 4. It comprises an electrically conductive aluminum wire 21 having a first end portion 21a connected to the grid 15 and a second end portion 21b adhesively bonded to the rear face 3b of the support 3. The wire 21 has a central portion received in a through hole 22 formed between the front and rear faces of the support 3 in order to open out between two adjacent sensors 2 facing the grid 15. In addition, the wire 21 is covered in an insulating sheath 23 arranged between the first and second end portions 21a and 21b in order to electrically insulate the support 3 and the sensors 2.

The electrical power supply to the grid 15 and to the sensors 2 thus passes via the inside of the support 3, thereby limiting the area occupied by the grid and making it possible for two detectors 1 to be placed side-by-side without increasing the clearance between two adjacent sensors 2 for the purpose of passing a conductor wire 21.

An oblong connection point 25 can be seen for connecting the conductor wire 21 to high voltage via the ceramic circuit 4.

The components are bonded together by epoxy and silver adhesive that serves not only to fasten the parts, but also to conduct electricity.

Naturally, the invention is not limited to the embodiment described, but covers any possible variant within the scope of the claims.

The adhesive may be replaced by other assembly means such as soldering, welding, or mechanical assembly.

The conductor wire is made of aluminum. Nevertheless, other conductive materials such as copper, steel, or gold could also be used.

Alloys other than those mentioned maybe used, for example an alloy of the Invar type.

The invention claimed is:

1. A plane detector for a gamma ray burst imager, the detector comprising a multilayer interconnection circuit between external connectors and a processor circuit fastened on a rear face of the circuit and a detection module fastened on a front face of the circuit, the detection module including a support having a rear face fastened to the circuit and a front face on which sensors are fastened, and a high voltage electrical connection device having a through portion passing through the support, wherein the electrical connection device extends between two adjacent sensors in order to connect a connection pad of the circuit to a conductive grid that extends at least in part between the sensors and that is electrically connected to a free face of each sensor.

2. The detector according to claim 1, wherein the through portion of the electrical connection device includes a conductor wire having, between two bare end portions, a central portion that is covered in an insulating sheath in order to insulate it electrically from the support.

3. The detector according to claim 2, wherein the conductor wire is made of aluminum.

4. The detector according to claim 1, wherein the grid comprises connection pads (16) arranged to cover corners of four adjacent sensors.

5. The detector according to claim 1, wherein the voltage applied to the sensors lies in the range −400 V to −800 V.

6. The detector according to claim 1, wherein the components are assembled together by adhesive.

7. The detector according to claim 6, wherein the adhesive used is of the epoxy and silver type.

8. The detector according to claim 1, wherein the sensors are made of cadmium telluride.

9. The detector according to claim 1, wherein the conductive grid is made of an FeNi29Co18 alloy.

* * * * *